(12) United States Patent
Unger et al.

(10) Patent No.: US 6,752,123 B2
(45) Date of Patent: Jun. 22, 2004

(54) METHOD FOR OPERATING AN INTERNAL COMBUSTION ENGINE

(75) Inventors: Eduard Unger, Leibnitz (AT); Alois Fuerhapter, Graz (AT); Gernot Philipp, Graz (AT)

(73) Assignee: AVL List GmbH, Graz (AU)

( * ) Notice: Subject to any disclaimer, the term of this patent is extended or adjusted under 35 U.S.C. 154(b) by 119 days.

(21) Appl. No.: 10/234,107

(22) Filed: Sep. 5, 2002

(65) Prior Publication Data

US 2003/0056736 A1 Mar. 27, 2003

(30) Foreign Application Priority Data

Sep. 6, 2001 (AT) ........................................ 694/2001 U (51) Int. Cl.[7] ................................................. F02B 5/02
(52) U.S. Cl. ................. 123/305; 123/90.15; 123/568.14
(58) Field of Search ........................... 123/90.15, 90.16, 123/90.17, 90.18, 568.14, 295, 305, 435

(56) References Cited

U.S. PATENT DOCUMENTS

| | | | | |
|---|---|---|---|---|
| 6,321,715 | B1 | * | 11/2001 | Dong .................... 123/568.14 |
| 6,390,056 | B1 | * | 5/2002 | Hertzberg et al. ..... 123/568.14 |
| 6,390,057 | B2 | * | 5/2002 | Yoshizawa et al. .... 123/568.14 |
| 2003/0056750 | A1 | * | 3/2003 | Fuerhapter ............... 123/90.17 |

FOREIGN PATENT DOCUMENTS

| | | |
|---|---|---|
| DE | 19818596 | 11/1989 |
| DE | 19927479 | 12/1999 |
| DE | 19950142 | 5/2000 |
| DE | 19923413 | 11/2000 |
| EP | 0890738 | 1/1999 |
| EP | 1085192 | 3/2001 |

OTHER PUBLICATIONS

T. Aoyama et al., "An Eperimental Study on Premixed–Charge Compression Ignition Gasoline Engine" in SAE Technical Paper Series 960081, Detroit, Michigan, Feb. 26–29, 1996.

* cited by examiner

Primary Examiner—Erick Solis
(74) Attorney, Agent, or Firm—Dykema Gossett PLLC

(57) ABSTRACT

The invention relates to a method for operating an internal combustion engine which is operated in at least one engine operation range in a substantially homogeneous self-ignited manner and in at least a second engine operation range in a substantially homogeneous spark-ignited manner, with a changeover occurring during engine operation between homogeneous self-ignited operation and homogeneous spark-ignited operation depending on the load and vice-versa.

In order to enable the changeover process between the engine operation ranges in an engine-protecting and delay-free manner and with low fuel consumption and low emissions it is provided that the homogeneous self-ignition operation is changed into the homogeneous spark-ignition operation and/or the homogeneous spark-ignition operation into the homogeneous self-ignition operation in a transition-less way from one cycle to the next cycle, with an exhaust gas mass which is reduced with respect to the requirements for a stationary homogeneous self-ignition operation being recirculated or left in the cylinder during the changeover process from the homogeneous spark-ignition operation to the homogeneous self-ignition operation.

10 Claims, 6 Drawing Sheets

METHOD FOR OPERATING AN INTERNAL COMBUSTION ENGINE

BACKGROUND OF THE INVENTION

The invention relates to a method for operating an internal combustion engine which is operated in at least one engine operation range in a substantially homogeneous self-ignited manner and in at least a second engine operation range in a substantially homogeneous spark-ignited manner, with a changeover occurring during engine operation between homogeneous self-ignited operation and homogeneous spark-ignited operation depending on the load and vice-versa, as well as an internal combustion engine for performing the method.

The combustion of a lean fuel/air mixture which is ignited by self-ignition leads to the advantage that due to the homogeneous concentration and temperature distribution extremely low emission values are achieved for $NO_x$ and exhaust particulates. This method is known in the English-speaking countries as "HCCI" method (Homogeneous Charge Compression Ignition). The low content of $NO_x$ exhaust gas in the HCCI method is obtained by the fact that the combustion commences at a plurality of ignition locations, as a result of which the combustion occurs with a relatively low combustion temperature. Gasoline shows considerable advantages over diesel fuel for the HCCI method due to its very low willingness for auto-ignition and the lower boiling range of between approx. 30° and 190°. The compression ratio can be increased in this case, as in a diesel engine, to values of approx. 15 to 17. Since the precise time of the ignition can fixed only at low effective medium pressure in the desired manner shortly before the upper dead center, the achievable effective mean pressure is limited in the HCCI method in a disadvantageous manner to the partial-load range, as is explained in the publication "An Experimental Study on Premixed-Charge Compression Ignition Gasoline Engine", Taro Aoyama et al., SAE 960081.

DESCRIPTION OF THE PRIOR ART

DE 199 27 479 A1 describes a method for operating an internal combustion engine operated with gasoline which provides that the internal combustion engine is self-ignited in a homogeneous way below a predetermined limit value of the effective medium pressure and is operated in a spark-ignited manner above the limit value. In this way the advantages of the HCCI method can be used without its disadvantages.

The HCCI operating mode is provided primarily to cover the low- and partial-load fields, whereas the spark-ignited engine operation is used for the higher partial load and the full load. In the dynamic operation of an internal combustion engine it is unavoidable to change between the two operating modes during the operation of the engine without producing serious losses in the torque delivery in the transition phases.

From EP 1 085 192 A2 an internal combustion engine is known which is operated in the medium partial-load range in a homogeneous self-ignited manner and in the upper partial-load range, in the full-load range as well as the lowermost partial-load range in a homogeneous spark-ignited fashion. In the range of the changeover from spark-ignited to self-ignited operation the quantity of recirculated exhaust gas is increased in order to ensure a secure self-ignition. Conversely, during the changeover from self-ignited to spark-ignited operation the quantity of recirculated exhaust gas is reduced on time in order to prevent knocking phenomena. During the change from one operating mode to another a transitional operation is performed while fuel is injected directly into the combustion chamber and a stratified charge is produced. A stable and even combustion during the change of the operating times is to be thus achieved. The transitional operation has a disadvantageous effect on the response characteristic and the emissions.

In homogeneous spark-ignition operation, the filling is usually realized by throttling the supply of fresh air by means of a throttling member in the fresh-air line or by throttling the fresh-air supply by means of a variable valve drive mechanism. If one examines a constant speed/load load in both operating modes it will be seen that at the same torque delivery in the homogeneous spark-ignited operation substantially more energy is bound in the exhaust gas than in HCCI operation. This fact is of decisive importance when the operating mode is to be changed. In addition, the homogeneous spark-ignition mode is operated with a substantially lower exhaust gas recirculation than the homogeneous spark-ignition operation.

During HCCI operation, the filling of the cylinder is not throttled. Instead, the engine is driven in this operating mode in an unthrottled manner. On changing the operating point, the filling composition changes which is composed of the mass of fresh-air, the recirculated mass of exhaust gas of the last combustion and the injected fuel mass. In this operating mode the cylinder charge is conditioned with the help of the recirculated exhaust gases in such a way that a self-ignition process can occur. The compression ignition occurs via the temperature increase of the fuel-air mixture during the compression phase in which the cylinder charge is compressed to a minimum residual volume.

When the internal combustion engine is operated in both operating modes in a stationary manner, the required mass of fresh air and the mass of recirculated exhaust gas is read out from engine characteristics map records which were determined under stationary conditions and set via adjusting the phase adjuster, the variable valve drive and/or the electric throttle member. Since the temperature conditions, and in particular the exhaust gas temperatures, deviate to an extremely high extent from the stationary values in the transitional phases, it is necessary to correct the mass of fresh air and the recirculated or compressed residual gas mass in these transitions in such a way that no excessive strain occurs in the internal combustion engine in the transient phase.

The choice as to which internal combustion engine is most suitable for which operating point is determined by a superset operating mode coordinator. The critical aspect in the change of the operating mode is the transition from the homogeneous spark-ignited operation to the homogeneous self-ignited operation because already in the first cycle after the changeover the cylinder charge needs to be composed in such a way that a combustion with self-ignition occurs at the right crank position. A very decisive variable which influences the position of the combustion in homogeneous self-ignition operation is the mixing temperature of the cylinder charge. If the mixing temperature of the cylinder charge is too high, the combustion occurs too early and the occurrence of very high pressure increases must be expected. This is accompanied by an enormous strain on the engine and a loud combustion noise. If on the other hand the mixing temperature of the cylinder charge is too low, the combustion occurs either too late or the conditions for the self-ignition are not achieved and a combustion misfire occurs. This constellation is to be avoided in order to avoid any noticeable torque drop at the clutch and on the other hand to keep the emissions of the internal combustion engine low.

SUMMARY OF THE INVENTION

It is the object of the present invention to improve a method of the kind mentioned above in such a way that an engine-protecting, low-emission and delay-free transition is possible between the engine operation ranges with homogeneous spark ignition and homogeneous self-ignition.

This is achieved in accordance with the invention in such a way that the homogeneous self-ignition operation is changed into the homogeneous spark-ignition operation and/or the homogeneous spark-ignition operation into the homogeneous self-ignition operation in a transitionless way from one cycle to the next cycle. An exhaust gas mass which is reduced with respect to the requirements for a stationary homogeneous self-ignition operation is recirculated or left in the cylinder during the changeover process from the homogeneous spark-ignition operation to the homogeneous self-ignition operation. By reducing the recirculated exhaust gas mass during the changeover phase it is possible to reduce the mixing temperature of the cylinder filling and subsequently the combustion state can be kept constant.

Due to the high exhaust gas temperatures in homogeneous spark-ignition operation, the recirculated exhaust gas mass is reduced for the first cycles of the homogeneous self-ignition operation because otherwise a combustion at a too early time would occur otherwise in which very high pressure gradients would have to expected in the combustion chamber. The adjustment of the recirculated exhaust gas mass can occur in such a way that for the purpose of reducing the recirculated exhaust gas mass the opening of at least one exhaust valve, which opening is performed for the purpose of internal exhaust gas recirculation during the inlet phase, is reduced during the intake phase and thus the mixing temperature of the filling is reduced. The adjustment of the recirculated exhaust gas mass can also occur as an alternative thereto via a combination of intake and exhaust control time by extending the intake control time and reducing the exhaust control time in order to compensate a filling loss. A further possibility is that for reducing the remaining exhaust gas mass the exhaust control time is increased during the exhaust phase. As a result, a lower exhaust gas mass remains in the cylinder at the end of the exhaust phase.

In order to enable a smooth transition from the spark-ignition operation to self-ignition operation it is advantageous when after the changeover-induced reduction the recirculated exhaust gas mass is increased continuously or discontinuously according to the requirements for homogeneous self-ignition operation depending on the combustion cycles that have occurred since the changeover. In an especially advantageous embodiment it is provided that at the time of the changeover a cycle counter is started which adds up the combustion cycles since the last homogeneous spark-ignited combustion and that the recirculated exhaust gas mass is determined as a function of the cycle count.

During the transition from homogeneous self-ignition operation to homogeneous spark-ignition operation, the valve control times can be changed abruptly from one cycle to the next cycle. In order to enable the performance of a compensation of the torque during the changeover phase, the ignition point can be adjusted during the changeover in the direction towards the upper dead center of the ignition.

The first engine operation range is allocated to homogeneous self-ignition and the second engine operation range to homogeneous spark-ignition.

The method is preferably employed with an internal combustion engine operated with gasoline in which it is provided that the internal combustion engine comprises a fully variable valve actuation device and a device for the controlled recirculation of exhaust gas, so that it is possible to change in a transitionless manner between homogeneous self-ignition operation and homogeneous spark-ignition operation and/or between homogeneous spark-ignition operation and homogeneous self-ignition operation.

BRIEF DESCRIPTION OF THE DRAWINGS

The invention is now explained in greater detail by reference to the enclosed drawings, wherein.

DETAILED DESCRIPTION OF THE PREFERRED EMBODIMENTS

The principal sequence of a changeover process from homogeneous spark-ignition operation SI to homogeneous self-ignition operation HCCI is shown in FIG. 1 for the case that it is changed over between the two modes in a hard fashion and no correction function is active during the changeover. FIG. 1 shows the cylinder pressure $p_i$, the heating curve Q and the integral heating curve DQ over the crank angle CDM. The calculation of the required gas mass flows as well as the necessary fuel mass are simultaneously calculated parallel in the background for the respectively inactive operating mode, so that the changeover process is possible at any time as long as the boundary conditions allow a change of operating mode. Within a working play, the desired fresh-air mass $m_{FL}$, the recirculated exhaust gas mass $m_E$, as well as the fuel mass for the desired operating mode is output during a changeover process as a correcting variable.

In order to reduce the mixing temperature $T_{misch}$ of the cylinder filling during the changeover from the homogeneous spark-ignition operation SI to the homogeneous self-ignition operation HCCI and to subsequently allow the combustion state MFG50% to be kept constant, the recirculated exhaust gas mass $m_E$ is reduced accordingly during the changeover phase. Due to the high exhaust gas temperatures in the homogeneous self-ignition operation HCCI, the recirculated exhaust gas mass $m_E$ is reduced for the first cycles of HCCI operation, because otherwise combustion would occur at a too early time in which very high pressure gradients would have to be expected in the combustion chamber. The adjustment of the recirculated exhaust gas mass $m_E$ can occur in such a way that the recirculated exhaust gas mass $m_E$ is reduced only through a reduction of the exhaust control time and thus the mixing temperature $T_{misch}$ of the filling is reduced or via a combination of the intake control time and the exhaust control time, such that the intake control time is extended and the exhaust control time is reduced in order to compensate a filling loss. In order to enable a continuous transition from SI operation to HCCI operation, the exhaust gas mass $m_E$, following the reduction, is increased again gradually during the changeover in accordance with a correction function.

Figure 4:
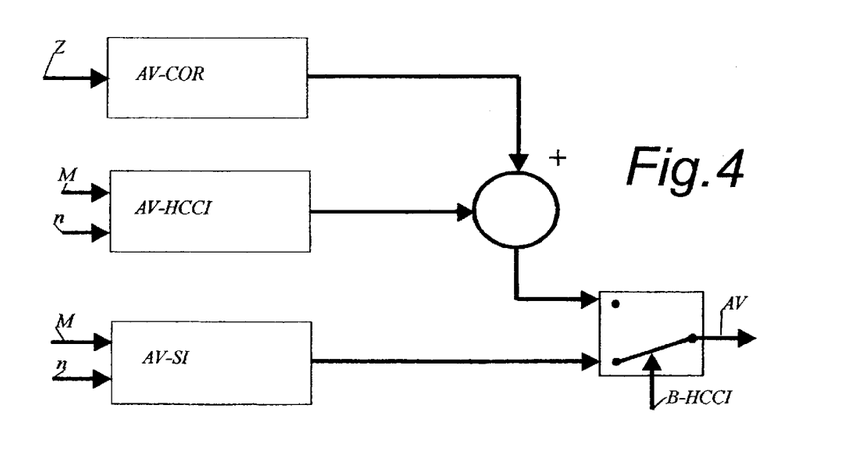
FIG. 4 shows a basic representation of the correction function.

The principle of realizing the correction function is shown in FIG. 4. The parameters for releasing the opening cross section of the gas change valves in stationary HCCI operation and in self-ignition operation SI are placed in the engine characteristics map AV-HCCI and AV-SI which are set up via the engine speed n and the load moment M. If a request B-HCCI occurs for the changeover to homogeneous self-ignition operation HCCI occurs, a cycle counter Z is started which adds up the working plays since the last homogeneous spark-ignition combustion SI. With its help, an engine characteristics map or a characteristic line AV-COR is addressed in order to influence the exhaust gas mass $m_E$ to be recirculated by the opening duration AV of the gas change valves during the changeover depending on the cycle count.

The sequence of the combustion cycles with the active correction function is shown in FIGS. 3a to 3d. Starting from the spark-ignited operating mode SI (FIG. 3a), the following combustion cycles already operate in the self-ignited mode HCCI. The correction function prevents that the energy conversion of the first combustions in the HCCI mode occur already before the upper dead center OT of the ignition.

Figure 5A:
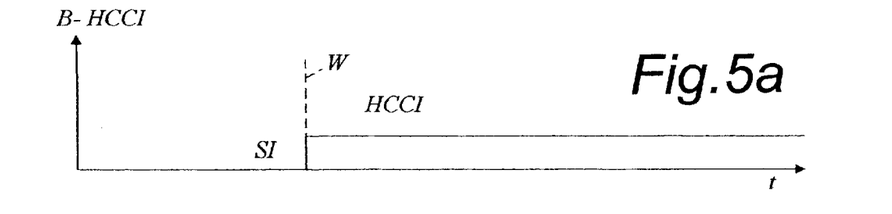
FIG. 5a through FIG. 5e show different engine parameters during the changeover process to homogeneous self-ignition operation.
Figure 5B:
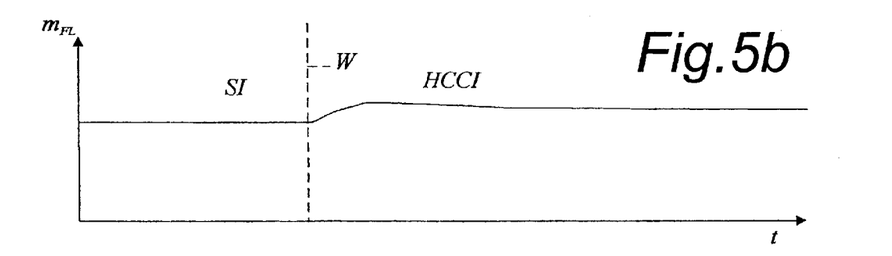
Figure 5C:
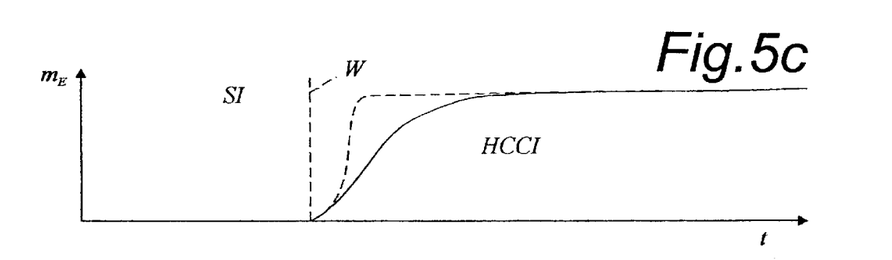
Figure 5D:
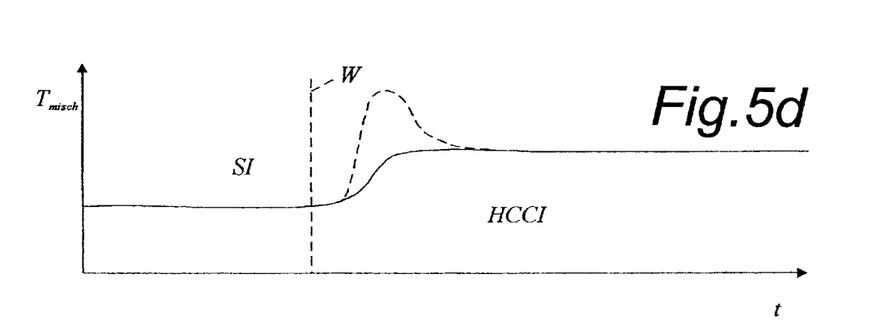
Figure 5E:
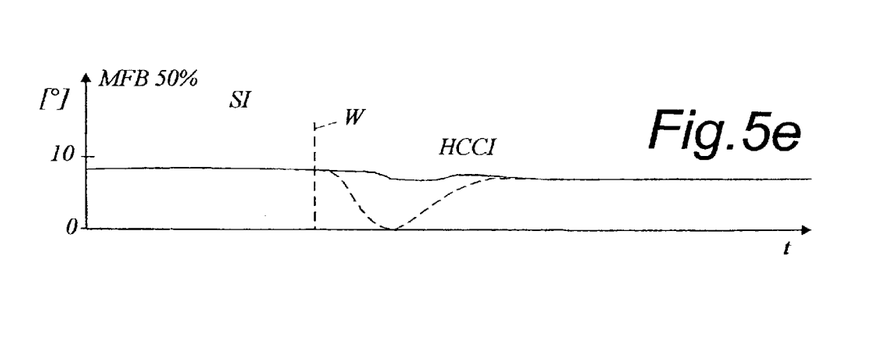

The adjustment of the recirculated exhaust gas mass $m_E$ can also realized in combination with an exhaust gas temperature model and a fast exhaust gas temperature sensor. The exhaust gas temperature model provides the exhaust gas temperature arising under stationary conditions for each speed/load point. The fast exhaust gas temperature sensor on the other hand measures the actual exhaust gas temperature. The difference of the two temperatures can be used as deviation in order to adjust the mixing temperature $T_{misch}$ under stationary conditions in such a way that no excessive mixing temperature values $T_{misch}$ of the filling occur. The temperature conditions or the charge composition during a changeover process W are compiled in FIGS. 5a to 5e over the time t. FIG. 5a shows the changeover command B-HCCI, FIG. 5b the fresh-air mass flow $m_{FL}$, FIG. 5c the recirculated exhaust gas mass $m_E$, FIG. 5d the mixing temperature $T_{misch}$ and FIG. 5e the 500% mass conversion point MFB50% in degrees of crank angle. The changeover W without correction function is shown with the broken line. The changeover W with correction function is shown with the unbroken line. This correction intervention can be taken back only after a number of HCCI combustions have occurred because stationary conditions are obtained again after a stabilization phase.

Figure 6:
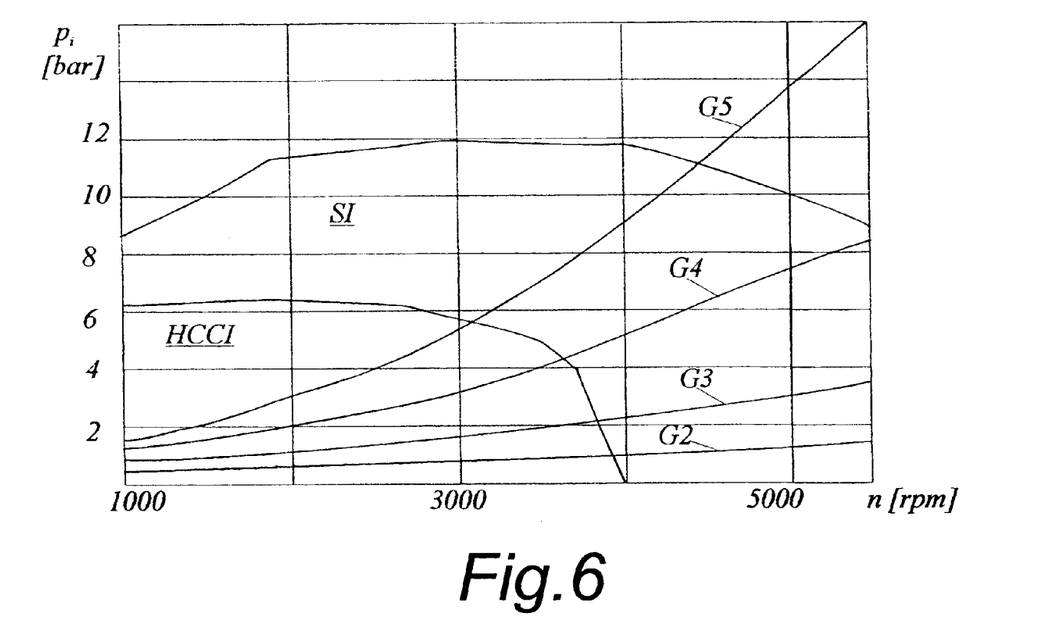
FIG. 6 shows an engine characteristics map with the different engine operation ranges.

FIG. 6 shows an engine characteristics map with the different operating ranges HCCI and SI, with the indicated medium pressure $p_i$ being entered over the engine speed n. The homogeneous self-ignition operation HCCI is allocated to the lower partial-load range, and the homogeneous spark-ignition range Si to the medium and upper partial load as well as the full-load range. Operating lines of various gear stages are shown with references $G_2$, $G_3$, $G_4$, $G_5$.

If the load demand becomes too high so that the operating range of self-ignition needs to be left, the cylinder filling can be changed from one cycle to the next cycle with the help of the variable valve drive to such an extent that the operating mode can easily be changed abruptly. During the changeover phase it is also possible to perform a momentary compensation with the help of an intervention in the advance angle (adjustment of the ignition time in the direction towards the upper dead center OT of the ignition).

Figure 1A:
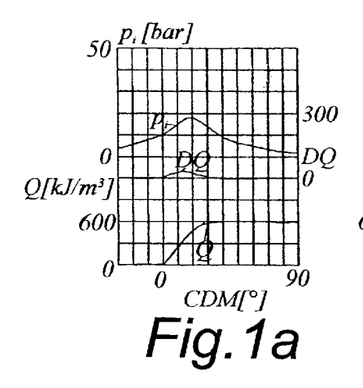
FIG. 1a through FIG. 1h show a changeover process broken down according to cycle from homogeneous spark-ignition operation to homogeneous self-ignition operation without correction function.
Figure 1B:
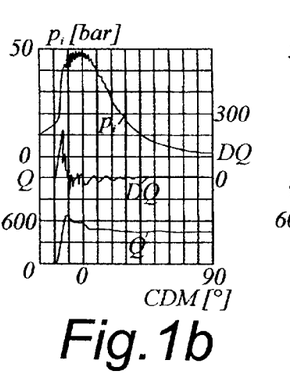
Figure 1C:
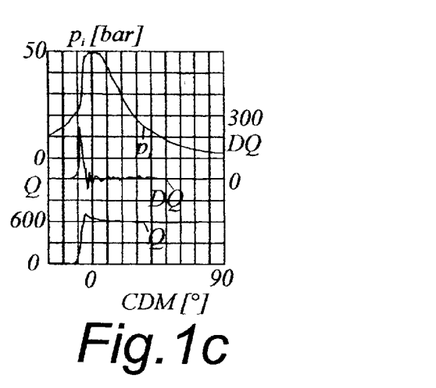
Figure 1D:
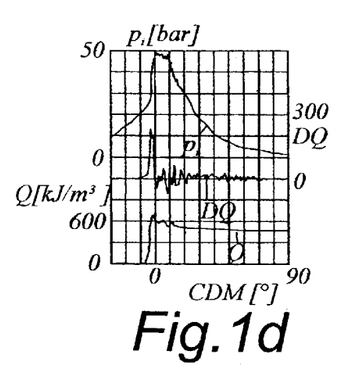
Figure 1E:
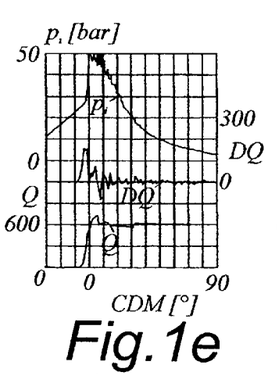
Figure 1F:
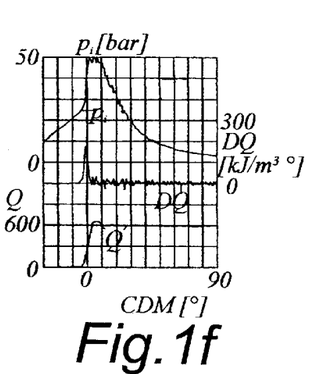
Figure 1G:
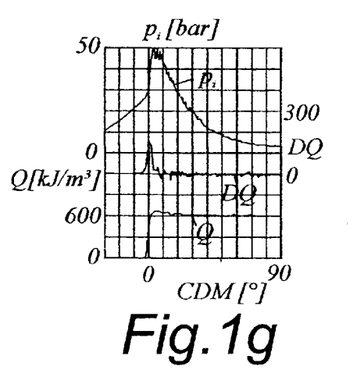
Figure 1H:
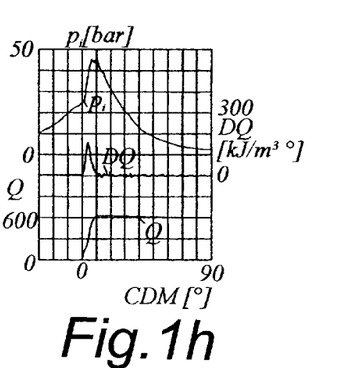
Figure 2A:
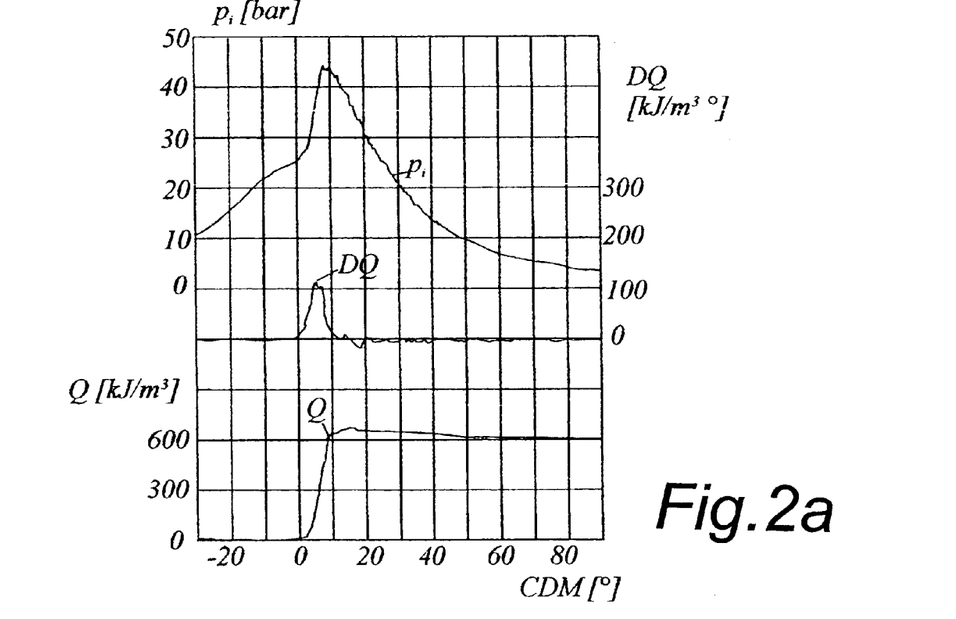
FIG. 2a through FIG. 2b show a changeover process broken down according to cycle from homogeneous self-ignition operation to homogeneous spark-ignition operation.
Figure 2B:
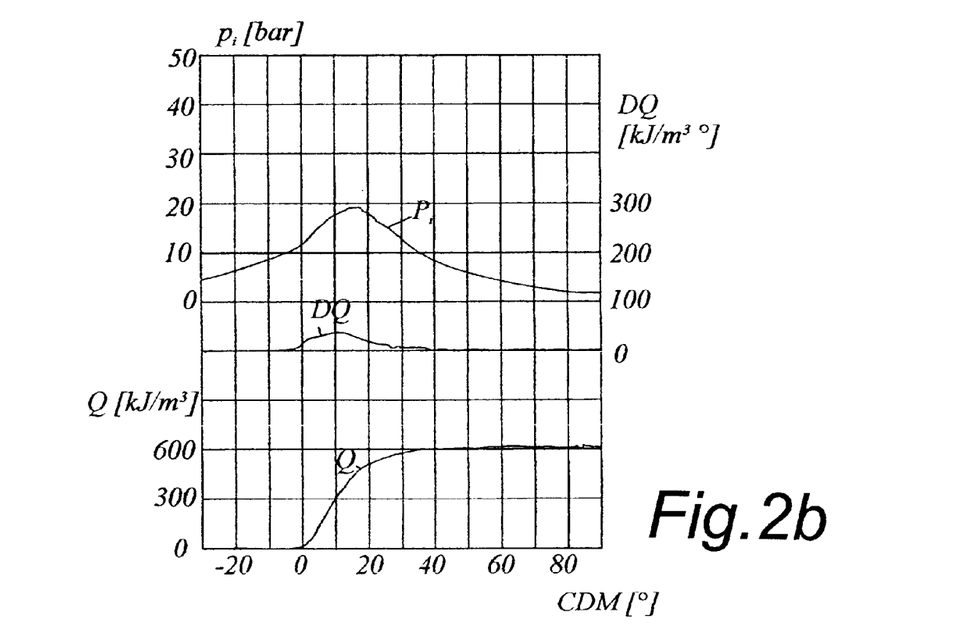
Figure 3A:
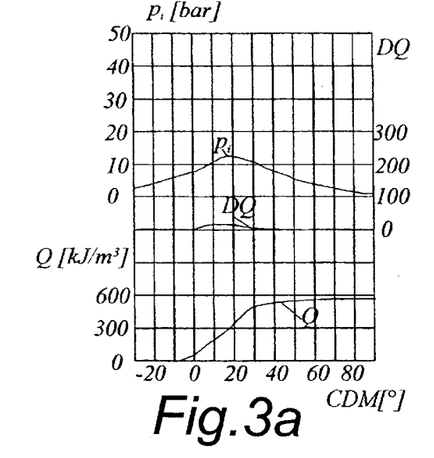
FIG. 3a through FIG. 3d show a changeover process broken down according to cycle from homogeneous spark-ignition operation to homogeneous self-ignition operation with active correction function for the recirculated exhaust gas mass.
Figure 3B:
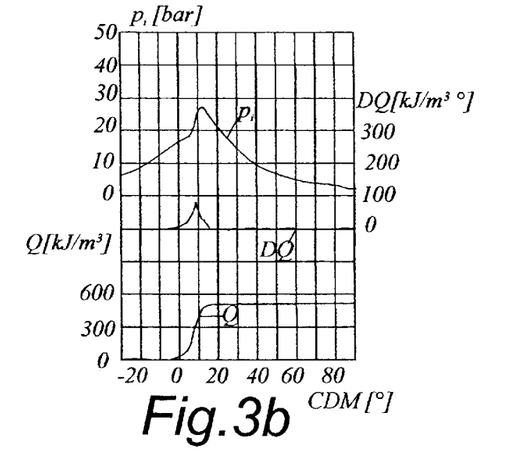
Figure 3C:
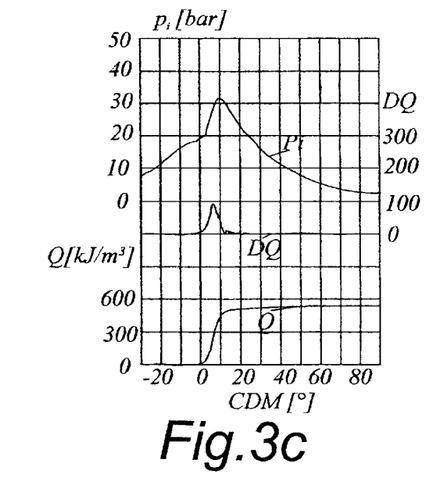
Figure 3D:
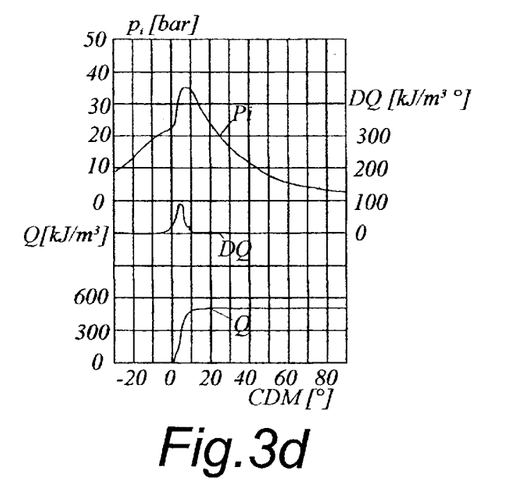

The principal connections during such a changeover process are shown in FIGS. 2a and 2b. As can be seen from the Figures, the combustion occurs already in the first cycle after the changeover at the correct crank angle position.

Figure 7:
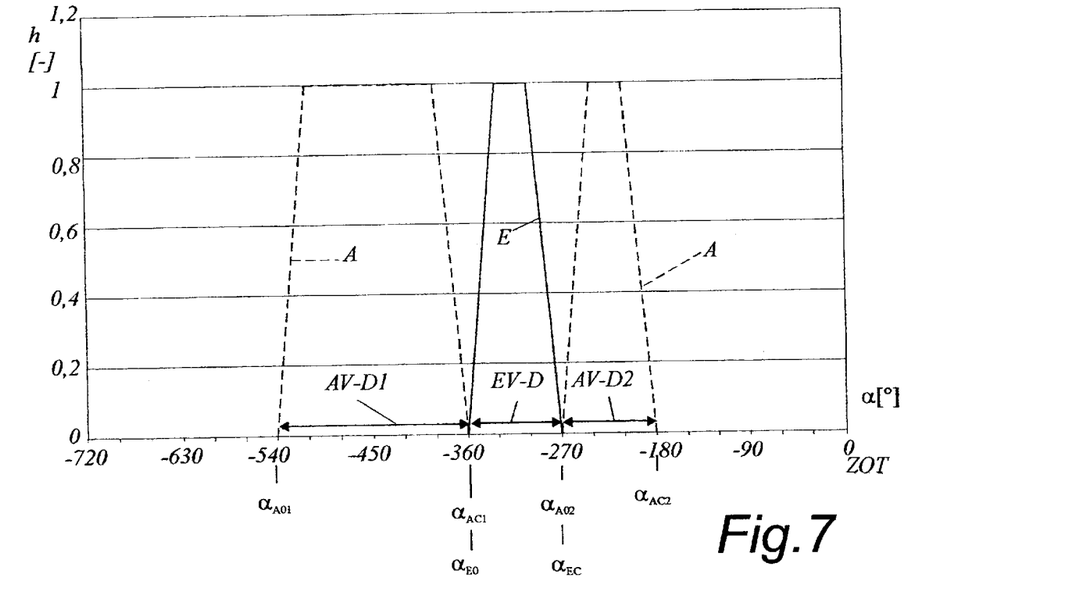
FIGS. 7 and 8 show a schematic stroke progress of the gas change valves in self-ignition operation according to a first embodiment in accordance with the invention and a schematic stroke progress of the gas change valves in self-ignition operation according to a second embodiment in accordance with the invention.

The metering of the recirculated exhaust gas can principally occur with the help of a variable valve drive in two different ways which will be explained by reference to FIGS. 7 and 8. The broken lines show the standardized valve stroke of the exhaust valve A in FIGS. 7 and 8. The unbroken lines show the valve stroke h of the intake valves E over the crank angle $\alpha$. Reference numerals $\alpha_{AO1}$, $\alpha_{AO2}$ and $\alpha_{AO}$ show the opening angles of the exhaust valves, $\alpha_{AC1}$, $\alpha_{AC2}$ and $\alpha_{AC}$ show the exhaust dwell angle, $\alpha_{EO}$ shows intake opening angle and $\alpha_{EC}$ shows intake dwell angle. The control times for the principle 1 are shown in FIG. 7. In this process the exhaust gas is pushed out during the phase AV-D1 and sucked into the combustion chamber again in the phase AV-D2. The exhaust valve opening angle $\alpha_{AO1}$ moves in the range of 570° to 510° crank angle before the upper dead center OT of the ignition, the exhaust valve dwell angle $\alpha_{AC1}$ in a range of 390° to 330° crank angle. The exhaust valve opening angle $\alpha_{AO2}$ moves in the range of 340° to 280° crank angle before the upper dead center ZOT of the ignition, the exhaust valve opening angle duration of phase AV-D2 in a range of 20° to 100° crank angle. The intake valve opens in the phase EV-D in a range of 380° to 280 crank angle before the upper dead center ZOT of the ignition, the intake valve opening duration EV-D is 30° to 150° crank angle. A reduction of the recirculated exhaust gas mass can occur by reducing the exhaust control time of the phase AV-D2.

Figure 8:
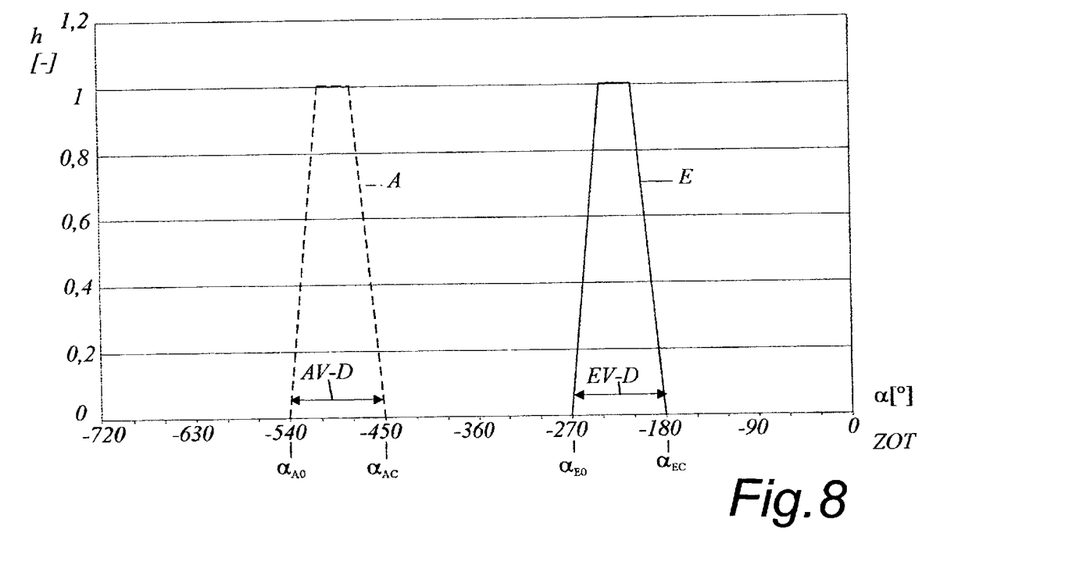

If the system is employed according to principle 2 of the so-called residual gas compression (as is shown in FIG. 8), a part of the exhaust gas mass remains in the cylinder after ending the exhaust phase. A reduction of the exhaust control time AV-D of the exhaust phase thus leads to an increase of the recirculated exhaust gas mass because more exhaust gas remains in the cylinder and thus leads to an increase of the mixing temperature in the cylinder. An extension accordingly leads to a reduction of the recirculated exhaust gas mass. The exhaust valve opening angle $\alpha_{AO2}$ moves in this variant in the range of 600° to 500° crank angle before the upper dead center ZOT of the ignition, the exhaust valve opening duration AV-D in a range of 20° to 150° crank angle. The intake valve opens in the phase EV-D in a range of 330° to 230° crank angle before the upper dead center ZOT of the ignition, the intake valve opening duration EV-D is 30° to 150° crank angle.

What is claimed is:

1. A method for operating an internal combustion engine which is operated in at least one engine operation range in a substantially homogeneous self-ignited manner and in at least a second engine operation range in a substantially homogeneous spark-ignited manner, with a changeover occurring during engine operation between homogeneous self-ignited operation and homogeneous spark-ignited operation depending on the load and vice-versa, wherein the homogeneous self-ignition operation is changed into the homogeneous spark-ignition operation and the homogeneous spark-ignition operation into the homogeneous self-ignition operation in a transitionless way from one cycle to the next cycle, with an exhaust gas mass which is reduced with respect to the requirements for a stationary homogeneous self-ignition operation being recirculated or left in the cylinder during the changeover process from the homogeneous spark-ignition operation to the homogeneous self-ignition operation.

2. The method according to claim 1, with at least one exhaust valve being opened during an intake phase for the purpose of internal exhaust gas recirculation, wherein for reducing the recirculated exhaust gas mass an exhaust control time is reduced during the intake phase.

3. The method according to claim 2, wherein an intake control time is additionally extended.

4. The method according to claim 1, with at least a part of the exhaust gas being left in the cylinder after the end of the exhaust phase, wherein for reducing the remaining exhaust gas mass the exhaust control time is increased during the exhaust phase.

5. The method according to claim 1, wherein after the reduction as caused by the changeover the recirculated exhaust gas mass is increased continuously or discontinuously according to the requirements for homogeneous self-ignition operation depending on the combustion cycles which have occurred since the changeover.

6. The method according to claim 5, wherein a cycle counter is started at the time of the changeover, which counter adds up the combustion cycles since the last homogeneous spark-ignition combustion and the recirculated exhaust gas mass is determined as a function of the cycle count.

7. The method according to claim 1, wherein at least during the transition process from homogeneous self-ignition operation to homogeneous spark-ignition operation the valve control times of at least one gas change valve can be changed abruptly from one combustion cycle to the next combustion cycle according to the respective operational requirements.

8. The method according to claim 7, wherein the ignition point is adjusted in the direction towards the upper dead center during the changeover process from homogeneous self-ignition operation to homogeneous spark-ignition operation.

9. The method according to claim 1, wherein the first engine operation range is allocated to the lower partial load and the second engine operation range is allocated to the medium and upper partial load and to full load.

10. An internal combustion engine which can be operated at partial load in a homogeneously self-ignited manner and at full load and high engine load in a spark-ignited manner, with it being possible during operation to change dependent on the load between homogeneous self-ignition operation and homogeneous spark-ignited operation and vice-versa, wherein the internal combustion engine comprises a fully variable valve actuation device and a device for the controlled recirculation of exhaust gas, so that it is possible to change in a transitionless manner between homogeneous self-ignition operation and homogeneous spark-ignition operation and between homongeneous spark-ignition operation and homogeneous self-ignition operation.

* * * * *

UNITED STATES PATENT AND TRADEMARK OFFICE
CERTIFICATE OF CORRECTION

PATENT NO. : 6,752,123 B2
DATED : June 22, 2004
INVENTOR(S) : Edward Unger, Alois Fuerhapter and Gernot Philipp It is certified that error appears in the above-identified patent and that said Letters Patent is hereby corrected as shown below:

<u>Title page,</u>
Item [73], Assignee, should read -- AVL List GmbH, Graz (AT) --

Signed and Sealed this

Seventh Day of September, 2004

JON W. DUDAS
*Director of the United States Patent and Trademark Office*